United States Patent [19]

Janes et al.

[11] 4,023,038

[45] May 10, 1977

[54] INCREASED IONIZATION RATE IN LASER ENRICHMENT

[75] Inventors: George Sargent Janes, Lincoln; Charles T. Pike, Lexington, both of Mass.

[73] Assignee: Jersey Nuclear-Avco Isotopes, Inc., Bellevue, Wash.

[22] Filed: Sept. 19, 1974

[21] Appl. No.: 507,583

[52] U.S. Cl. .......................... 250/423 P; 250/281
[51] Int. Cl.² .................................. H01J 39/34
[58] Field of Search ............ 250/281, 282, 423 P, 250/424

[56] References Cited

UNITED STATES PATENTS 3,772,519  11/1973  Levy et al. .................... 250/281

FOREIGN PATENTS OR APPLICATIONS 2,312,194  10/1973  Germany ......................... 250/288

OTHER PUBLICATIONS

"Plasma Ionization Enhancement by Laser Line Radiation," Oettinger et al., AIAA Journal, May 1970, vol. 8, No. 5, pp. 880–885.

Primary Examiner—Alfred E. Smith
Assistant Examiner—Bruce C. Anderson
Attorney, Agent, or Firm—Weingarten, Maxham & Schurgin

[57] ABSTRACT

A system employing multiple, upper excitation levels in a technique for isotopically selective ionization to improve the ionization efficiency. In a technique which employs laser radiation to excite particles with isotopic selectivity, excitation is produced to a plurality of excited states below the ionization level with the result of increasing the number of available excited particles for ionization and thereby increasing the ionization cross-section for improved system efficiency.

25 Claims, 5 Drawing Figures

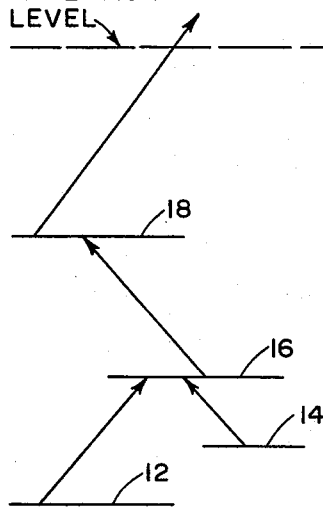
FIG. 1
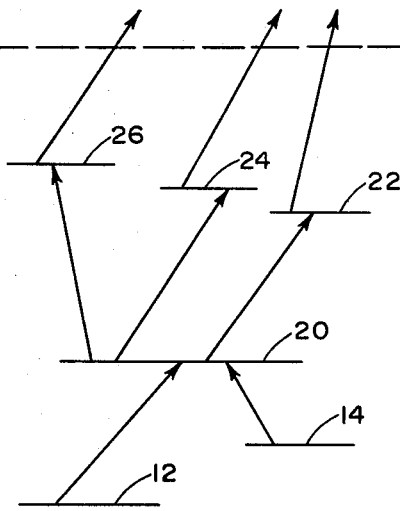
FIG. 2A
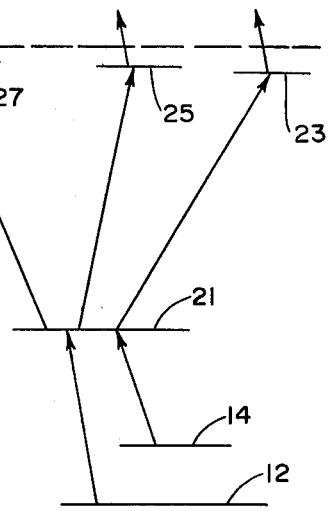
FIG. 2B
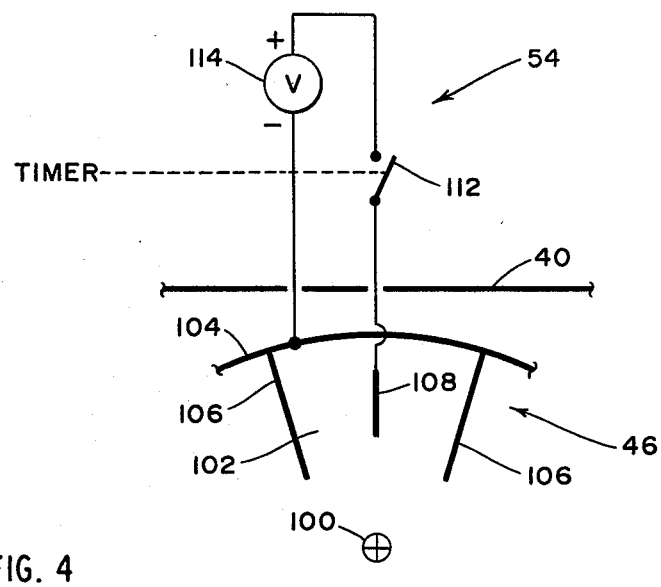
FIG. 4
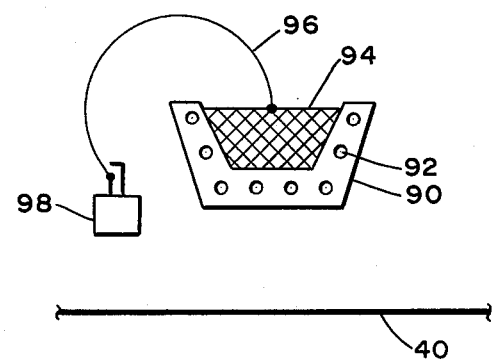

INCREASED IONIZATION RATE IN LASER ENRICHMENT

FIELD OF THE INVENTION

This invention relates to isotope separation and in particular to a technique for isotopically selective laser induced ionization from plural upper excited states.

BACKGROUND OF THE INVENTION

In the technique or uranium enrichment described in U.S. Pat. No. 3,772,519, and United Stages patent application Ser. No. 328,954, filed Feb. 2, 1973 and Ser. No. 469,407, filed May 13, 1974, all incorporated herein by reference, laser radiation is applied to a uranium vapor to create isotopically selective photoionization of isotopes of a desired, typically U-235, isotope without corresponding ionization of other isotope type particles. The technique illustrated there typically employs a plurality of energy steps in exciting the uranium particles from the ground energy state to the ionization continuum.

For employing this technique in production scale enrichment, it is advantageous to provide laser radiation for each energy step below ionization of sufficient intensity to create a condition wherein the illuminated particles are equally distributed among all of the reachable states. This condition is commonly referred to as saturation, the theoretical maximum percent excitation that can be achieved in a column of particles exposed to steady laser radiation. Since plural transitions may typically be employed to reach the ionization continuum, it is apparent that each of N energy states will be populated to an extent which is only 1/N of the population of the illuminated particles. If, for example, two steps having three energy states are used to reach the upper most level below ionization, there will be in the uppermost energy state below ionization at most only ⅓ of the total illuminated particles at any given moment. While the process of depletion of particles from this excited energy level by ionization will permit the population of particles to be continuously renewed, the steady state, relatively small percentage population of that energy level, will reduce the ionization cross-section which is typically already much smaller than the cross-section for the other transitions between excited energy states.

BRIEF SUMMARY OF THE INVENTION

In accordance with the preferred embodiment of the present invention, a system for laser induced isotope separation is disclosed which employs multiple, upper excitation levels, closely spaced in energy, which increases the overall ionization efficiency. Since theory predicts that the particles excited by laser radiation to plural excited levels will be equally distributed among the different levels which may be populated, an increase in the number of excited levels from which ionization is achieved increases the total number of particles available for ionization and improves system efficiency.

In one application of this technique, a first excited energy level is populated by transitions from the ground and at least one lower lying, naturally populated energy state, such as by the application of two frequencies of isotopically selective laser radiation. From this first excited energy state a plurality of additional transitions are induced to several closely spaced energy states below ionization by the use of a corresponding number of laser frequencies. The particles excited to these several upper excited energy states are then photoionized, with increased efficiency, by a single photoionizing laser.

In a further application, the plural, closely spaced excited states are placed close to the ionization level and collisional ionization is utilized from these plural upper levels.

The laser radiation employed for creating the plural transitions from the first excited states to the several upper excited energy levels may typically be produced by a single laser amplifier chain oscillating at several distinct frequencies in response to input laser excitation from corresponding laser oscillators. Only multiple oscillators must then be provided as opposed to duplication of an entire amplifier chain.

BRIEF DESCRIPTION OF THE DRAWING

These and other features of the present invention are more fully set forth below in the detailed descripton of the preferred embodiment, presented for purposes of illustration and not limitations, and in the accompanying drawing of which:

FIG. 1 is an energy level diagram illustrating the technique of laser induced isotopically selective ionization;

FIGS. 2A and 2B are energy level diagrams illustrating isotopically selective ionization according to the present invention;

FIG. 4 is a diagram schematically indicating an interior sectional portion of the apparatus in FIG. 3.

DETAILED DESCRIPTION OF THE PREFERRED EMBODIMENT

Figure 3:
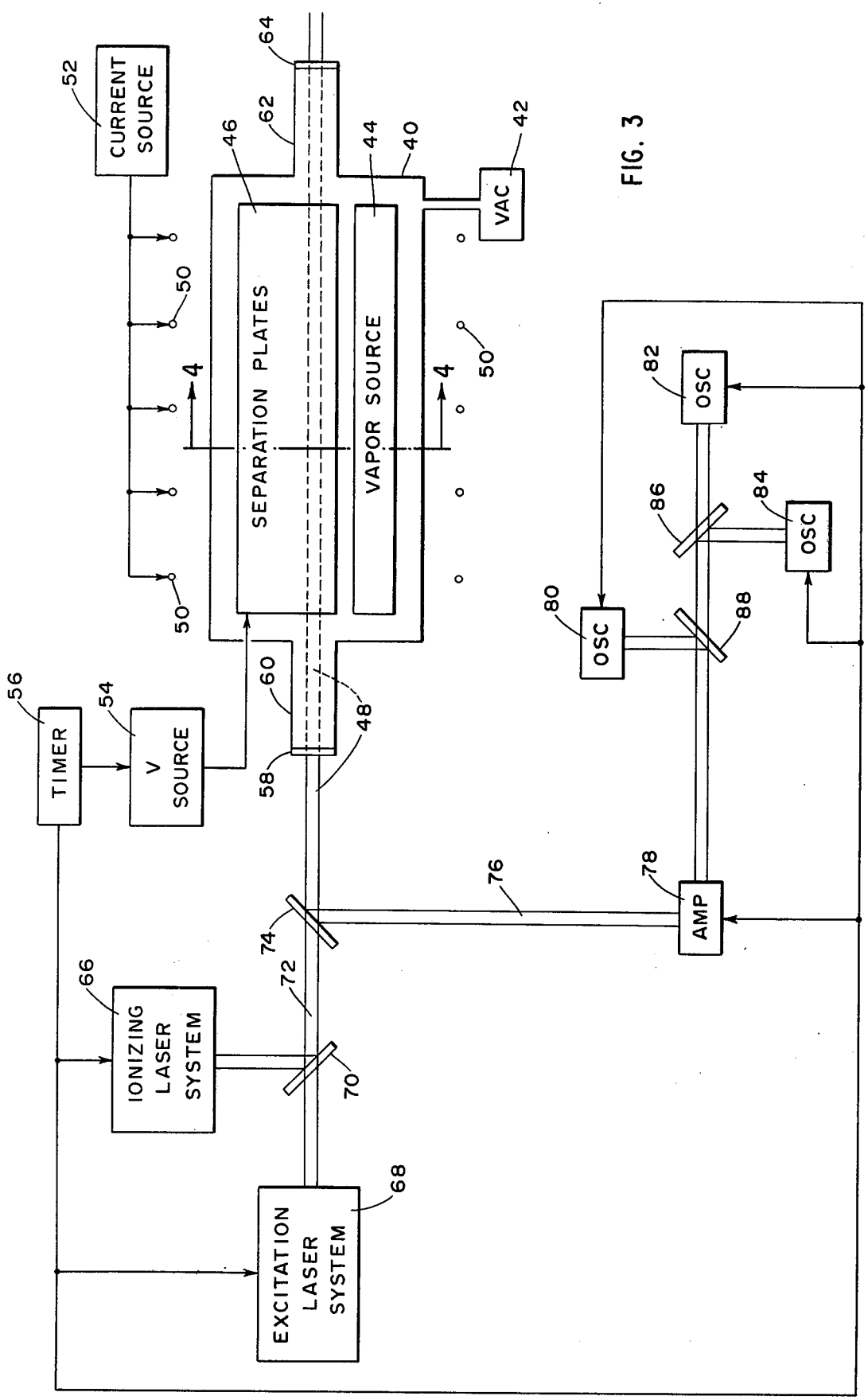
FIG. 3 is a diagram schematically illustrating apparatus for use in practicing the present invention in accordance with FIGS. 2A and 2B.

The present invention contemplates a system for laser isotope separation employing ionization transitions to the continuum from a plurality of upper excited energy states. The concept is implemented in the preferred embodiment in a system for elemental uranium enrichment but may be more broadly applied to ionization of molecular or atomic particles in a medium generally.

In accordance with the technique for laser induced, isotopically selective photoionization illustrated in FIG. 1, an environment of vapor state elemental uranium atoms of plural isotope types is exposed to pulsed laser radiation. The atoms of the uranium vapor will occur naturally in a ground energy state 12 and at least a first excited state 14, 620 wavenumbers ($cm^{-1}$) above the ground state 12. Typically, the U-235 atoms, but not correspondingly the U-238 atoms, in the two energy states will be excited to a first excited energy state 16 by two finely tuned frequency components of the applied laser radiation. From the excited state 16, a further frequency component in the applied laser radiation excites those atoms to an upper excited energy state 18 from which ionization may be achieved by application of further ionizing laser radiation.

Theoretical evaluations for a single upper level 18 indicate that the effective rate of photoionization to the continuum is given by the expression:

$$n_a F_r \sigma ion/N$$

where $n_o$ is the number of accessible neutrals, $F_v$ is the photon flux, σion is the photoionization cross-section, and N is the total number of levels participating. N in this example is 4 corresponding to the total number of the levels, 12, 14, 16 and 18. As can be seen from this equation, the photoionization rate is inversely proportional to the number of participating levels. This theoretical restraint is based upon conditions of saturated photoexcitation laser radiation which implies that for any given transition, the laser radiation for that transition will create an equal population of the upper and lower states.

Two processes of ionization with increased efficiency according to the present invention are illustrated in FIGS. 2A and 2B. The upper excited state in FIG. 2A is shown as plural levels instead of the single upper excited state 18 illustrated in FIG. 1. In FIG. 2A, illustrative of the preferred embodiment, excitations from the ground and first excited states 12 and 14 are created to an intermediate energy level 20. Level 20 may be a single excited level like level 16 in FIG. 1, or plural excited levels in order to satisfy parity requirements as is explained below. From the level 20, excitation is produced to a plurality of upper excited energy levels 22, 24 and 26. In the preferred embodiment, the plural levels 22, 24 and 26 are closely spaced, typically separated by or spanning a range of approximately 10 angstroms or less although it is possible to use upper excited energy levels covering a greater width.

In typical application, the laser radiation for producing the energy steps to the energy level 20 from levels 12 and 14 is located in the red portion of the visible spectrum, and the laser radiation for the transitions from the level 20 to the levels 22, 24 and 26 will be in the orange region of the visible spectrum. These ranges are not seen to be limitations on practicing the invention. Typically, the levels 22, 24 and 26 will be within a range of 14,000 to 16,000 wavenumbers of the ionization level for uranium which is approximately 6.2 ev. The specific absorption lines for each transition may be selected from spectrographic analysis.

In practicing the invention in accordance with FIG. 2A, the ionization rate equation expressed above is modified by replacing the foregoing expression with the expression:

$$n_o F_t \sigma ion(M+1)/M+N)$$

where M is the number of additional upper states. In the FIG. 2A example, M is 2, N remains at 4, and the total expression yields a photoionization rate which is twice as large as that for the conditions of FIG. 1.

While the separation technique of FIG. 2A has been illustrated with respect to a single level 20 and three upper excited levels 22, 24 and 26, it may be desirable to employ more than a single level at the state 20 for parity limitations governing the transitions to the plural, closely spaced levels 22, 24 and 26. Additionally, the number of upper excited states need not be limited to three, but may range from two to any higher number. The practical restraint on the number of upper excited states is the number of separate laser frequencies required for the transitions to those plural upper excited states as is discussed below.

With respect to FIG. 2B, there is shown a further application for the present invention whereby the multiple closely spaced upper levels are placed within approximately 0.03 ev. of the ionization level so that ionization by electron impact may be achieved. In FIG. 2B, the uranium atoms are excited from the lower levels 12 and 14 through one or more tandem intermediate levels represented by the line 21 and from there are further excited by plural frequencies of laser radiation to levels 23, 25 and 27, all within approximately 0.03 ev. (350 cm$^1$) of the ionization level. The levels available for this purpose within the top 0.03 ev. of excitation energy appear to be numerous and the plural excited levels, such as the levels 23, 25 and 27, may be within a range of 30 cm$^{-1}$ or less than 0.003 ev. The system of electron impact ionization, as fully described in the above-incorporated application Ser. No. 469,407, basically utilizes the presence of electrons or other particles provided from emissions in uranium vaporization as described by the Saha equation, or otherwise.

Apparatus which may be employed for practicing the invention discussed with respect to FIGS. 2A and 2B is illustrated in FIGS. 3 and 4. With specific regard to FIG. 3, there is shown a chamber 40 for isotopically selective ionization according to the present invention. The chamber 40 may be made typically of stainless steel or other low permeability material and is evacuated by a vacuum pump system 42 to a low pressure of approximately 10$^{-5}$ torr in the region where laser radiation is applied. A beam of uranium vapor is reduced from a vapor source 44 and directed upward into the region of separation plates 46 where a beam 48 of laser radiation is applied to produce isotopically selective excitation and, for the FIG. 2A embodiment, ionization.

The chamber 40 is surrounded by a set of current carrying coils 50 which are excited by a current source 52 to produce in the region of the separation plates 46 a magnetic field along the path of the beam 48. A voltage source 54 applies repeated pulses of electric potential for typically about 2 microseconds duration in the region of the separation plates 46 to cooperate with the magnetic field produced by the coils 50 to accelerate the ionized particles for collection on the plates 46 as will be explained below. The pulses of electric potential are initiated and terminated by a timer 56.

The laser radiation in beam 48 consists of frequencies for achieving the transitions illustrated in FIGS. 2A or 2B and is generated in pulses typically of up to a microsecond duration under the control of timer 56. The radiation in beam 48 is applied to the chamber 40 through a window 58 on an extension pipe 60 and exits the chamber via corresponding pipe 62 and window 64 typically for application in one or more further chambers. Each pulse of radiation in beam 48 is timed to occur just prior to the voltage pulse provided by voltage source 54 in typical implementation.

The radiation in beam 48 is a composite of several frequencies produced by separate laser systems. In the FIG. 2A embodiment, the ionizing radiation for the transitions from states 22, 24 and 26 is provided by an ionizing laser system 66 which may typically be a dye laser of 100 millejoule/cm$^2$ power output per pulse. In addition, an excitation laser system 68 is provided for the excitation from energy state 12 to energy state 20 or 21, and if added efficiency is desired for excitation, from the state 14 to state 20 or 21. For this purpose, the laser system 68 may include one or more of the Dial-A-Line lasers produced by the Avco Everett Research Laboratory, Everett, Massachusetts. These lasers may include additional frequency limiting components such as etalon filters to sufficiently narrow the radiation bandwidth so as to produce isotopic selectivity in the radiation produced by the system 68. One or more stages of amplification may be included within the laser system 68 for each frequency in order to boost the radiation intensity in the output beam to approximately 10 millejoule/cm$^2$ in each pulse of radiation. A suitable combining means 70, such as dichroic mirror, or prism, responds to the radiation from the laser systems 66 and 68 to combine them into a single beam 72. In the FIG. 2B embodiment, laser system 66 and combining means 70 are not utilized. System 66 may be like system 68 with more gain.

The radiation in beam 72 is combined through a combining means 74, with a beam 76 of radiation from a laser amplifier 78 which may typically include a chain of several stages of laser amplification. The laser amplifier 78 responds to laser radiation from a set of separate laser oscillators 80, 82 and 84 whose outputs are combined by combining means 86 and 88, such as beam splitters, into a single beam for application to the amplifier 78. The oscillators 80, 82 and 84 may typically comprise CW dye lasers and the laser amplifier 78 may typically comprise flashlamp pumped dye laser amplifier and flashlamp or laser pumped preamplifier lasers. The oscillators 80, 82 and 84 are tuned in frequency to the transitions from the energy level 20 in FIG. 2A to respective levels 22, 24 and 26 or the transitions from level 21 to levels 23, 25 and 27 as shown in FIG. 2B. In the case where the levels 22, 24 and 26, or 23, 25 and 27 are within a range of approximately 20 angstroms, it is practicable for amplifier stage 78 to amplify the combined beams rather than using separate amplifiers with less economy and greater difficulty in combining such closely spaced frequencies without power loss. Frequencies for the laser radiation from the oscillators 80, 82 and 84 may typically lie in the orange portion of the visible spectrum for the embodiment of FIGS. 2A and 2B (in the case of two well separated levels for state 21).

With respect now to FIG. 4, there is shown an interior sectional view of the chamber 40 along the section lines indicated in FIG. 3. As shown there, the vapor source typically comprises a crucible 90 having a plurality of cooling ports 92 therein and containing a mass 94 of elemental uranium which is vaporized by the energy imparted by an electron beam 96 from a filamentary electron beam source 98. A magnetic field 100 from coils 50 and typically in the range of one to several hundred gauss is operative to deflect and focus the beam 96 to a line or series of spots on the surface of the uranium mass 94 for vaporization thereof. The vaporized uranium expands in a generally cosine distribution above the point of impact of the beam 96 into the region of the collection plates 46 which typically define a plurality of chambers 102, one of which is shown in FIG. 4. The chambers 102 consist of conducting, electrically connected rear and side plates 104 and 106 respectively. The rear plate 104 forms a cylindrical section above the point of uranium vaporization and the side plates 106 extend radially toward the point of vaporization. The plates 104 and 106 extend the length of the separation plates 46 illustrated in FIG. 3. An electrode 108 is placed centrally within each chamber 102 and extends radially toward the vapor source line 96. As shown in FIG. 4, the voltage source 54 consists of switch 112 (of state of the art electronic design) series connected with a potential source 114 of approximately 10 to 100 volts, 40 to 60 volts being typical. The negative terminal of potential source 114 is connected to the plates 104 and 106, while the positive terminal is connected through the switch 112 to the electrode 108. The electrode 108 and crucible 90 are typically maintained at the same potential.

The number of chambers 102 which may be provided to intercept the uranium vapor flow is limited only by the angle of expansion of the vapor flow itself. The distance at which the chambers 102 are placed from the crucible 90 may be 10 centimeters and the dimensions from side to side of the chambers 102 may be approximately 5 centimeters.

For use in a production system several chamber 40 may be cascaded to serially intercept the radiation in beam 48 for more complete utilization of the radiation energy therein. In such application, the use of the multiple upper excited energy levels 22, 24 and 26, or 23, 25 and 27, reduces the self lasing gain of the uranium vapor itself within the chambers 40 by distributing the inversion energy within the uranium particles throughout several excited states rather than a single upper state.

In addition, the beam 48 within each chamber 40 may typically be reflected serially through each chamber 102, half the chamber at a time, by suitable reflecting surfaces placed either within or without the chamber 40. For this purpose, the dimensions of the beam 48 are typically maintained at approximately 2 centimeters by 2.5 centimeters in height.

Having described above a preferred embodiment according to the present invention, it will occur to those skilled in the art that modifications and alterations to the disclosed system may be practiced within the spirit of the invention. It is accordingly intended to limit the scope of the invention only as indicated in the following claims.

What is claimed is:

1. A method for increasing the number of selectively excited particles available for ionization in an environment comprising the step of:

applying electromagnetic energy to an environment of particles of plural isotope types including particles of one isotope type to excite and distribute the particles of the one isotope type to a plurality of distinct energy levels below the ionization level for the particles of said one isotope type from which plural energy levels the particles are available for ionization;

the plural energy levels being closely spaced in energy;

the applied energy having plural distinct frequencies corresponding to absorption lines for the particles of the one isotope type.

2. The method of claim 1 further including the step of applying further energy to the selectively excited particles of the one isotope type at the plurality of closely spaced energy levels to produce separate ionization thereof.

3. The method of claim 2 wherein the further energy applying step includes the step of applying further electromagnetic energy to the environment of particles.

4. The method of claim 2 wherein the step of applying further energy to ionize the particles is achieved by impact ionization and the plural distinct closely spaced energy levels below the ionization level are within a small fraction of an electron volt of the ionization level for the particles of the one isotope type.

5. The method of claim 1 wherein the particles of the environment comprise uranium atoms in a vapor state.

6. The method of claim 1 wherein the plural distinct frequencies are within several tens of angstroms.

7. The method of claim 1 further including the step of:
applying electromagnetic energy to the environment of particles to excite with isotopic selectivity particles of the one isotope type to at least one excited energy level from which the particles are excited by the energy having the plural distinct frequencies to the plurality of closely spaced energy levels below the ionization level.

8. The method of claim 7 further including the steps of:
impact ionizing the particles in the closely spaced energy states below the ionization level;
the closely spaced energy states below the ionization level being within approximately 0.03 electron volts of the ionization level.

9. The method of claim 7 further including the step of:
applying further electromagnetic energy to the environment with a frequency for ionizing the particles in the closely spaced energy states below the ionization level.

10. The method of claim 7 wherein the number of energy steps from the at least one excited energy level to said plural distinct closely spaced energy levels exceeds in number of steps, the energy steps to said at least one excited energy state.

11. The method of claim 10 wherein the number of steps from said at least one excited energy level to the plural levels exceeds the number of steps to said at least one excited energy level by one.

12. The method of claim 1 wherein the electromagnetic energy includes laser radiation.

13. The method of claim 12 wherein said laser radiation is applied to the environment in an intensity generally sufficient to provide saturation.

14. The method of claim 1 wherein said electromagnetic energy is applied in accordance with the steps of:
generating laser radiation in separate laser oscillators for each of the plural distinct frequencies;
amplifying in combination the laser radiation from each of said laser oscillators in a unitary laser amplifier system;
applying the amplified laser radiation from said plural distinct oscillators to the environment of particles.

15. The method of claim 1 wherein the environment of particles includes a long column of uranium atoms in which the existence of the plural closely spaced energy states reduces the self lasing gain of the column.

16. The method of claim 1 further including the steps of:
separately ionizing the particles in said closely spaced plural distinct energy levels below the ionization level; and
separating the ionized particles from said environment by crossed-field forces.

17. A method for producing isotopically selective ionization of particles of one isotope in an environment of plural isotope types comprising the steps of:
applying electromagnetic energy to the environment of particles of plural isotope types including the particles of the one isotope type to produce at least one isotopically selective energy step in the particles of the one isotope type to at least one excited energy state;
applying further energy to the particles of the environment excited to the at least one excited energy state to excite and distribute the particles of that one isotope type from the at least one energy state to a plurality of distinct energy states below the ionization level for the particles of said one isotope type from which plural energy states the particles are available for ionization;
the plural energy states being within an energy range which is a small percentage of the energy of ionization of said particles;
the applied further energy having plural distinct frequencies; and
applying second further energy to the particles in said environment in said plural distinct energy states to produce ionization thereof.

18. The method of claim 17 wherein said second further energy includes electromagnetic energy.

19. The method of claim 17 wherein said second further energy includes energy transferred from impacting particles.

20. Apparatus for increasing the number of selectively excited particles available for ionization in an environment comprising:
means for applying electromagnetic energy to an environment of particles of plural isotope types including particles of one isotope type to excite and distribute the particles of the one isotope type to a plurality of distinct energy levels below the ionization level for the particles of said one isotope type from which plural energy levels the particles are available for ionization;
the plural energy levels being closely spaced in energy;
the applied energy having plural distinct frequencies corresponding to absorption lines for the particles of the one isotope type.

21. The apparatus of claim 20 wherein said means for applying electromagnetic energy includes:
a plurality of laser oscillators;
means for combining the laser radiation from the plurality of laser oscillators into a single laser beam;
unitary laser amplifier means responsive to the radiation in the single beam for providing amplification thereof, the amplified radiation being applied as electromagnetic energy to the environment of particles.

22. The apparatus of claim 21 wherein:
said plurality of laser oscillators include CW dye lasers;
said laser amplifier includes a flashlamp pumped dye laser amplifier and a laser preamplifier.

23. The apparatus of claim 21 further including:
means for defining the environment of particles as a long column or uranium vapor;
the plurality of closely spaced energy states below the ionization level limiting the self lasing gain of the column of uranium vapor particles.

24. A method for increasing the efficiency of isotopically selective ionization in an environment of particles of plural isotope types comprising the steps of:
applying to said environment of plural isotope types radiant energy to produce isotopically selective photoexcitation of particles of at least one isotope type to a plurality of excited states;

ionizing particles in a portion, less than all, of the plurality of excited states in a plurality of ionization transients each originating from a separate one of the portion of plurality of excited states;

said portion of said plurality of excited states from which said plurality of ionization transitions originate differing in energy by a small percentage of an electron volt.

25. A method for increasing the efficiency of isotopically selective excitation of an environment of particles of plural isotope types comprising the steps of:

photoexciting particles of a selected isotope type in said environment of plural isotope type particles without correspondingly exciting particles of another isotope type;

producing a plurality of distinct transitions in the excited particles to an energy level above the ionization level thereby ionizing the photoexcited particles;

the ionizing transitions including energy steps along a plurality of distinct energy paths, each of which including a unique, excited energy state below the ionization level and in which each of the unique energy states for each of the ionization transitions is different from the excited state of the other of said plurality of ionization transitions by an energy difference which is a small fraction of an electron volt.

* * * * *